(12) United States Patent
Narita

(10) Patent No.: US 6,502,990 B2
(45) Date of Patent: Jan. 7, 2003

(54) HYDRODYNAMIC BEARING DEVICE

(75) Inventor: Takayuki Narita, Shimosuwa-machi (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 0 days.

(21) Appl. No.: 09/848,147

(22) Filed: May 3, 2001

(65) Prior Publication Data

US 2002/0018603 A1 Feb. 14, 2002

(30) Foreign Application Priority Data

May 10, 2000  (JP) .......................................... 2000-136606

(51) Int. Cl.[7] ............................................... F16C 32/06
(52) U.S. Cl. ...................................... 384/100; 384/107
(58) Field of Search ................................. 384/100, 107, 384/114, 119, 121, 124

(56) References Cited

U.S. PATENT DOCUMENTS 5,097,164 A * 3/1992 Nakasugi et al. ...... 250/231.16
5,743,656 A     4/1998 Gomyo et al. ............. 384/124
6,339,515 B2 * 1/2002 Lee et al. .................. 310/67 R

FOREIGN PATENT DOCUMENTS

JP            06-178490           6/1994

* cited by examiner

Primary Examiner—Thomas R. Hannon
(74) Attorney, Agent, or Firm—Reed Smith LLP

(57) ABSTRACT

The invention is a hydrodynamic bearing device including a shaft member having a dynamic pressure generating surface rotatably attached to a cylindrical bearing sleeve having a dynamic pressure generating surface, with a gap between the attached dynamic pressure generating surfaces being filled with a lubricant. To prevent the lubricant from leaking, a covering member is fixed by adhesive to one of the openings of the bearing sleeve. A two-part liquid epoxy resin is applied to seal a gap in a joining portion between the bearing sleeve and the covering member. The adhesive satisfies the condition, $n/2 \leq m \leq 2n$, where m is the molecular-weight of a primary agent and n is the molecular-weight of a curing agent.

6 Claims, 2 Drawing Sheets

HYDRODYNAMIC BEARING DEVICE

RELATED APPLICATIONS

This application claims Paris Convention priority of Japanese patent application number 2000-136606 filed on May 10, 2000, the complete disclosure of which is hereby incorporated by reference.

BACKGROUND OF THE INVENTION

A. Field of the Invention

The present invention relates to a hydrodynamic bearing device in which a dynamic pressure is generated in a lubricant filled between a dynamic pressure generating surface on a shaft member and a dynamic pressure generating surface on a bearing sleeve to relatively rotate and support both members and, more specifically to a structure and method of fixing a covering member which prevents the leakage of the lubricant.

B. Description of the Background of the Invention

In recent years, various proposals have been made concerning a hydrodynamic bearing device for supporting high speed rotation of various rotary bodies such as magnetic disks, optical disks, polygonal mirrors. FIG. 4 shows an enlarged major portion of a hydrodynamic bearing device. In the hydrodynamic bearing device, a dynamic pressure generating surface 11 on a shaft member (rotary shaft) 10 and a dynamic pressure generating surface 21 on a bearing sleeve 20 are opposed to one another via a predetermined gap. Dynamic pressure generating grooves (not illustrated) are cut on at least one of the dynamic pressure generating surfaces 11 and 21 which are opposed to each other. A lubricant 6 such as oil and air is filled in the gap. As the rotary body rotates, a pressure is applied to the lubricant 6 through a pumping action of the dynamic pressure generating grooves to generate a dynamic pressure, with which the shaft member 10 and the bearing sleeve 20 are rotatably supported in a relatively non-contact manner.

A ring-like thrust plate 30 is fitted to an end of the shaft member 10 and stored inside a storing portion 23 which has a diameter larger than the inner diameter of the bearing surface 21 on the bearing sleeve 20. At the opening portion of the bearing sleeve 20, a disk-like covering member 40 tightly abuts to an outer surface of a step 22 provided to create the storing portion 23 and is fixed by an adhesive 70 and a caulking portion 24.

Thrust dynamic pressure generating grooves (not illustrated) are cut on the axial end surfaces of the thrust plate 30 or the end surfaces of the covering member 40 and bearing sleeve 20 which face the axial end surfaces of the thrust plate 30 so that a dynamic pressure is generated in the lubricant 6 as the thrust plate 30 rotates. With this, the thrust plate 30, the bearing sleeve 20, and the covering member 40 are supported in a non-contact manner. Note that the code 50 indicates a frame holding the bearing sleeve with the inner circumferencial surface thereof.

In such a hydrodynamic bearing device, it is important to prevent the lubricant 6 therein from leaking to the outside of the device. One of the general countermeasures is shown in FIG. 4. The covering member 40 and the bearing sleeve 20 are joined together by an adhesive 70 applied in a radial gap S1 therebetween to prevent the leakage of the lubricant 6.

However, when a normal adhesive is applied to join the covering member 40 and the bearing sleeve 20 in a hydrodynamic bearing device, it causes the following problems.

Since the surfaces of the covering member 40 and bearing sleeve 20 are finished by a lathe, fine cutting marks are left thereon. Even if the step portion 22 of the bearing sleeve 20 and the covering member 40 are put together, there is a sub-micron order gap S2 therebetween in the thrust direction. Therefore, as the adhesive 70 is applied in the gap S1, it permeates to the gap S2 with capillary action.

As a result, the covering member 40 becomes slightly raised with respect to the step portion 22 of the bearing sleeve 20, which changes the height inside the storing portion 23, and therefore, the gap between the thrust plate 30 and the shaft member 10 in the thrust direction varies to a great extent. Also, the adhesive 70 that has permeated into the gap S2 between the step portion 22 of the bearing sleeve 20 and the covering member 40 may diffuse to the inside the device and mix in the lubricant 6. If the uncured adhesive 70 is mixed in the lubricant 6, the viscosity of the lubricant 6 greatly increases. This increases the rotational load, which requires more power.

Considering the above problems, an objective of the present invention is to provide a hydrodynamic bearing device in which a covering member is fixed more firmly by an adhesive which can be hardened for sure, so that the lubricant is kept from leaking and the adhesive from permeating into the lubricant.

SUMMARY OF THE INVENTION

In accordance with one embodiment of the invention, a hydrodynamic bearing device is disclosed which comprises: a cylindrical bearing sleeve which has a first dynamic pressure generating surface; a shaft member which has a second dynamic pressure generating surface and is attached relatively rotatable to the bearing sleeve; a lubricant filled in a gap between the first and second dynamic pressure generating surfaces; a covering member which is fixed by adhesive to one of the openings of said bearing sleeve to prevent the lubricant from leaking; and an adhesive which is applied in a joining portion between the bearing sleeve and said covering member to seal a gap therebetween; wherein the adhesive is a two-part liquid epoxy resin adhesive that satisfies the condition, $n/2 \leq m \leq 2n$, where m is the molecular-weight of a primary agent and n is the molecular-weight of a curing agent.

In accordance with another embodiment of the present invention, a hydrodynamic bearing device is disclosed which comprises: a cylindrical bearing sleeve which has a first dynamic pressure generating surface; a frame which has a sleeve holding portion for holding said bearing sleeve; a shaft member which has a second dynamic pressure generating surface and is attached relatively rotatable to the bearing sleeve; a lubricant filled in a gap between the first and second dynamic pressure generating surfaces; a covering member which is fixed by adhesive to one of the openings of the frame to prevent the lubricant from leaking; and an adhesive which is applied to a joining portion between the bearing sleeve and the covering member to seal a gap therebetween; wherein the adhesive is a two-part liquid epoxy resin adhesive that satisfies the condition, $n/2 \leq m \leq 2n$, where m is the molecular-weight of a primary agent and n is the molecular-weight of a curing agent.

Although in present invention the covering member is joined to a different covering member, the bearing sleeve or the frame, the same adhesive is used to join them. The two-part liquid epoxy resin, in which the molecular-weight of the primary agent is relatively close to the molecular-weight of the curing agent, is used to join the covering member and the counter member; therefore, the primary agent and the curing agent diffuse at the same time into the gap between the covering member and the counter member (the gap in the thrust direction and/or radial direction). This causes a curing reaction in the gap for sure. Consequently this prevents the adhesive from remaining uncured and from diffusing into the lubricant. Thus, the covering member is firmly secured by the adhesive, and the adhesive is kept from leaking to the outside of the hydrodynamic bearing device.

In the hydrodynamic bearing device of the present invention, it is preferred that the primary agent and the curing agent are substantially equivalent in the molecular-weight. With this, the primary agent and the curing agent diffuse in any gap under the same condition, and the invention of claim 1 or 2 becomes more effective.

In the hydrodynamic bearing device of the present invention, it is ideal to further use a joining means by caulking, screwing, or welding for joining the covering member and the counter member. With this, the joining strength between the covering member and the counter member is increased, improving shock resistance of the hydrodynamic bearing device.

DETAILED DESCRIPTION OF A PREFERRED EMBODIMENT OF THE INVENTION

Figure 1:
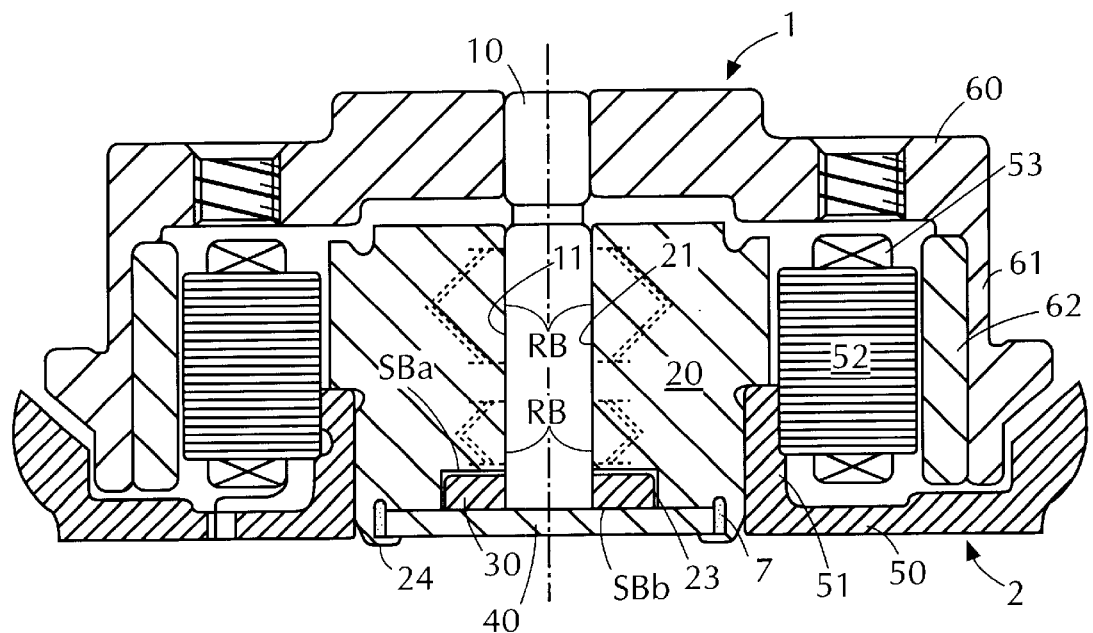
FIG. 1 is a cross-sectional view of a spindle motor in which a hydrodynamic bearing device of the present invention is applied.

Embodiments of a hydrodynamic bearing of the present invention are described hereinafter referring to the drawings. An embodiment illustrated in FIG. 1 is a spindle motor for driving disks, such as hard disks, in which a hydrodynamic bearing of the present invention is applied. The hydrodynamic bearing device can be applied as a hydrodynamic bearing device in various machines.

The rotary-shaft-type spindle motor as illustrated in FIG. 1 comprises a stator assembly 2 as a fixed member and a rotor assembly 1 as a rotary member, which is rotatably attached to the stator assembly 2. The stator assembly 2 has frame 50, which is screwed to an enclosure of a drive device main frame (not illustrated). Inside a cylindrical sleeve holding portion 51 provided in the center portion of the frame 50, a cylindrical hollow bearing sleeve 20 is united to the frame 50 by a fixing means such as press-fitting or shrinkage fitting. The bearing sleeve 20 is composed of a copper material such as phosphor bronze that facilitates the process thereof, and has a center hole with opening portions at both ends. A stator core 52 having a drive coil 53 wound around salient-poles thereof, which radially project, is fitted with an outer circumferencial surface of the sleeve holding portion 51.

A rotary shaft 10, a constituent of the rotor assembly 1, is rotatably inserted in the center hole of the bearing sleeve 20. A first dynamic pressure generating surface 21 is created on the inner circumferencial surface of the bearing sleeve 20, and a second dynamic pressure generating surface 11 is created on the outer circumferencial surface of the rotary shaft 10. The bearing sleeve 20 and the rotary shaft 10 are opposed to one another such that both the dynamic pressure generating surfaces 11 and 21 closely face each other to configure a radial hydrodynamic bearing portion RB. More specifically, the first dynamic pressure generating surface 21 on the bearing sleeve 20 and the second dynamic pressure generating surface 11 on the rotary shaft 10 are opposed to one another with a radial gap of several $\mu$m. Filled in the bearing space of the radial gap is a lubricant 6 such as an ester or poly-α-olefin lubricant oil or a magnetic fluid. In addition, herringbone-shaped radial dynamic pressure generating grooves, for example, are cut in two blocks in the axial direction at least on the first dynamic pressure generating surface 11 or on the second pressure generating surface 21. When the rotary shaft 10 rotates, a pressure is applied to the lubricant 6 through a pumping action of the radial dynamic pressure generating grooves to generate a dynamic pressure, and thereby the rotary shaft 10 and a hub 60, which will be described later, are rotatably supported.

The hub 60, another constituent of the rotor assembly 1, is composed of a ferrous metal in a cup shape to mount thereon a recording medium such as a magnetic disk (not illustrated). The upper end of the rotary shaft 10 is fixed to a joint hole in the center of the hub 60 by a fixing means such as press-fitting, shrinkage fitting, or an adhesive. A cylindrical rotor magnet 62, which is magnetized in advance with alternate N and S by a predetermined interval around the circumferencial direction, is adhered onto the inner surface of a circumferencial wall 61 of the hub 60. Note that the hub 60 may be composed of an aluminum metal, and the rotor assembly 1 may be configured such that the rotor magnet 62 is attached to the hub 60 via a back yoke made of a magnetic substance.

An annular thrust plate 30 is adhered to a bottom portion of the rotary shaft 10 in the figure. The thrust plate 30 is arranged to be stored in a cylindrical storing portion 23 formed in the bottom center portion of the bearing sleeve 20 in the figure. Inside the storing portion 23 of the bearing sleeve 20, the thrust plate 30 and the bearing sleeve 20 create an upper thrust hydrodynamic bearing portion SBa with dynamic pressure generating surfaces thereof closely opposed in the axial direction.

A counter plate 40, a disk-like covering member, is attached to close the lower opening portion of the bearing sleeve 20 and positioned closely to the lower dynamic pressure generating surface of the thrust plate 30. An adhesive 7 is filled in the radial gap S1 between the outer circumferencial portion of the counter plate 40 and the bearing sleeve 20 to establish the counter plate 40. The composition of the adhesive 7 is described later. The upper dynamic pressure generating surface of the counter plate 40 and the above mentioned dynamic pressure generating surface of the thrust plate 30 creates a lower thrust hydrodynamic bearing portion SBb.

More specifically describing, both dynamic pressure generating surfaces in a pair of thrust hydrodynamic bearing portions SBa and SBb on the thrust plate 30 side and both dynamic pressure generating surfaces on the bearing sleeve 20 and counter plate 40 are opposed in the axial direction via a small gap of several $\mu$m. A lubricant fluid such as lubricant oil or magnetic fluid is filled in the bearing space of the small gap such that it is continuous through the axial path on the outer circumference of the thrust plate 30.

Moreover, herringbone-shaped thrust dynamic pressure generating grooves are cut in a ring on the dynamic pressure generating surface of the thrust plate 30 and on at least one of the surfaces on the bearing sleeve 20 or the counter plate 40. During rotation, a pressure is applied to the lubricant through the pumping action of the thrust dynamic pressure generating grooves to generate a dynamic pressure, and thereby the rotary shaft 10 and the hub 60 are supported in the thrust direction.

Figure 4:
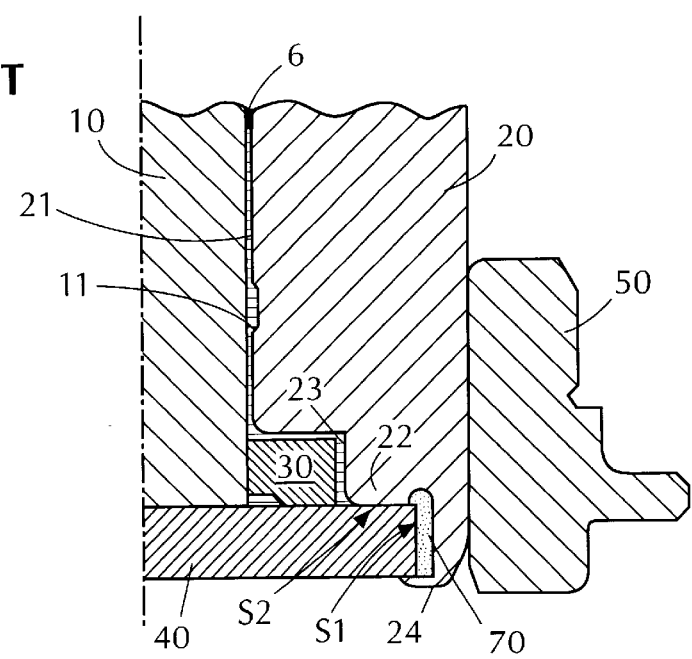
FIG. 4 is an enlarged major portion of a hydrodynamic bearing device of a prior art.

The joining structure (joining method) between the bearing sleeve 20 and the counter plate 40 as a covering member is described in detail. The present inventor has tested an UV-curing resin adhesive, a one-part liquid epoxy resin adhesive, and a two-part liquid epoxy resin adhesive as the adhesive 7 for joining the bearing sleeve 20 and the counter plate 40. Each of them is applied in a different spindle motor. The structure of the joining portion itself is the same as that of FIG. 4.

Experiment 1
UV-curing resin adhesive

When an UV-cured resin adhesive is applied in the gap S1 between the bearing sleeve 20 and the counter plate 40, because of a small gap S2 between a step 22 of the bearing sleeve 20 and the counter plate 40, the UV-cured resin adhesive permeates to the gap S2 due to capillary action. In addition, since the UV does not reach the gap S2, the resin remains uncured. It is found that uncured resin has mixed in the lubricant 6. Also, the UV-cured resin is an acrylic resin, which is relatively vulnerable to oil. As the UV-cured resin comes into contact with the oil lubricant in the gap between the bearing sleeve 20 and the counter plate 40, the UV-cured resin swells, resulting in degrading sealability. It is understood from the result that it is not appropriate to use the UV-cured resin adhesive for joining the counter plate 40 in the hydrodynamic bearing device.

Experiment 2
One-part liquid epoxy resin adhesive

Next the present inventor has tested the performance of a one-part liquid epoxy resin adhesive by applying it to the gap S1 between the bearing sleeve 20 and the counter plate 40. The epoxy resin is generally excellent in oil resistance. Therefore, even when the epoxy resin comes into contact with the oil lubricant 6, the sealability is not degraded. Also the one-part liquid epoxy resin is a liquid resin in which a curing agent in particles of approximately 5~20μm diameter is dispersed in the primary agent. By heating this liquid resin, the curing agent is liquefied and dissolved in the primary agent to cause a reaction between the primary agent and the curing agent. In this manner, the entire resin is hardened.

However, when an adhesive of this type is applied to the gap S1 between the bearing sleeve 20 and the counter plate 40, only the primary agent diffuses to the gap S2 of only sub-micron order between the step 22 of the bearing sleeve 20 and the counter plate 40, the particulate curing agent is stopped at the entrance, and the uncured primary agent is found in the gap S2 between the step 22 and the counter plate 40. This is caused by fact that the particle diameter of the curing agent is larger than the gap S2. The uncured primary agent in the gap S2 mixes with the lubricant 6, increasing the viscosity of the lubricant 6. This results in requiring more power for the motor. Thus, it is understood that it is not appropriate to use the one-part liquid epoxy resin adhesive for joining the counter plate 40.

Experiment 3
Two-part liquid epoxy resin adhesive

Finally, the present inventor has tested the performance of the two-part liquid epoxy resin adhesive by applying it to the gap S1 between the bearing sleeve 20 and the counter plate 40. The two-part liquid epoxy resin adhesive is excellent in oil resistance. This adhesive is used such that a liquid primary agent and a liquid curing agent are mixed in advance, applied to the joining portion, and heated to cause a curing reaction between the primary agent and the curing agent. Unlike the above mentioned one-part liquid epoxy resin adhesive, the curing agent is never stopped at the entrance of the gap between the step 22 of the bearing sleeve 20 and the counter plate 40. Thus, a relatively good bonding condition can be obtained.

However, a problem is found even with the two-part liquid epoxy resin adhesive. If there is a great difference in the molecular-weight between the primary agent and the curing agent, the diffusion speed differs. When each of the agents diffuses in the gap S2 between the step 22 and the counter plate 40, the different diffusion speeds separate the primary agent and the curing agent. Consequently the resin may remain uncured. In other words, since the agent having the smaller molecular-weight diffuses in the gap S2 faster than the other agent having the larger molecular-weight, the resin having the smaller molecular-weight always exists at the diffusing front end of the adhesive where the resin having a larger molecular-weight is absent. Thus, the primary agent and the curing agent, which have been once mixed, separate from one another. If the adhesive is heated under the condition wherein the two solvents are separated, the resin remains uncured. When the lubricant 6 is applied, uncured resin permeates into the lubricant 6 from the inner side of the joining portion between the step 22 and the counter plate 40, in the same manner as in the above mentioned one-part liquid epoxy resin adhesive. As a result, the viscosity of the lubricant 6 increases, which in turn increases the motor consuming power.

Then, the present inventor has paid attention to the difference in the molecular-weight between the primary agent and the curing agent in the two-part liquid epoxy resin adhesive and has performed experiments: the ratio of the molecular-weight between the agents (primary agent:curing agent) is changed varyingly and each example is applied in the joining portion between the bearing sleeve 20 and the counter plate 40 to observe the curing condition. Table 1 shows the results.

TABLE 1

| Example | Primary agent molecular-weight | Curing agent molecular-weight | Ratio of molecular-weight | Curing condition |
|---|---|---|---|---|
| Experiment A | 300 | 150 | 1:0.50 | Completely cured |
| Experiment B | 340 | 210 | 1:0.62 | Completely cured |
| Experiment C | 250 | 210 | 1:0.84 | Completely cured |
| Experiment D | 300 | 300 | 1:1 | Completely cured |
| Experiment E | 250 | 480 | 1:1.92 | Completely cured |
| Comparative A | 300 | 90 | 1:0.30 | Some uncured |
| Comparative B | 340 | 150 | 1:0.44 | Some uncured |
| Comparative C | 250 | 530 | 1:2.12 | Some uncured |

As understood from the results in Table 1, the two-part liquid epoxy resin adhesive having the molecular-weight ratio of Experiment A, B, C, D, or E is completely cured with no uncured resin left. On the other hand, the two-part liquid epoxy resin adhesive having the molecular-weight ratio of Comparative A, B, or C contains uncured resin. In other words, when the ratio of the molecular-weight between the primary agent and the curing agent is within the range 1:0.5 to 1:2, like the adhesives of Experiments A though E, the difference in the molecular-weight between both agents is relatively small. Consequently, both agents diffuse at the same speed even in the small gap between the members to be joined. Even when the two-part liquid epoxy resin adhesive is heated for curing immediately after it is applied, the curing reaction is caused in every part of the adhesive, leaving no uncured portion therein.

On the other hand, as understood from Comparatives A through C, the adhesive, in which the ratio of the molecular-weight between the primary agent and the curing agent is 1 to less than 0.5 or 1 to more than 2, has a relatively great difference in the molecular-weight between the agents, and the agents separate from one another in the gap between the members to be joined. The solvent having a larger molecular-weight becomes short in the gap, and the solvent having a smaller molecular-weight remains uncured in the gap after the curing process.

It is understood that the adhesive to be applied in the joining portion between the bearing sleeve 20 and the counter plate 40 can ideally be the two-part liquid epoxy resin adhesive which satisfies the condition, $$n/2 \leq m \leq 2n,$$

where m is the molecular-weight of the primary agent and n is the molecular-weight of the curing agent. By using such an adhesive, the primary agent and the curing agent never remain uncured, and the adhesive is prevented from permeating into the lubricant 6. Consequently the counter plate 40 as a covering member is firmly fixed to the bearing sleeve 20, and therefore the lubricant 6 is kept from leaking to the outside. Particularly the two-part liquid epoxy resin adhesive in which the molecular-weight, m, of the primary agent is approximately equivalent to the molecular-weight, n, of the curing agent is ideal because both agents diffuse at the same speed even in the small gap. This adhesive can join the counter plate 40 and the bearing sleeve 20 more securely and prevent the lubricant 6 from leaking. Also, the adhesive itself is kept from permeating into the lubricant 6.

Note that the epoxy resin is a chemical compound having in a molecule two or more epoxy sidearms as illustrated in Chemical formula 1. A typical structure of the epoxy resin is shown in Chemical formula 2.

the curing agent may be a polyamine group such as diamine, triamine, or a higher degree polyamine, a polyamide group, a dibasic acid and its anhydride, and a Lewis acid such as Boro trifluoride.

Even in the two-part liquid epoxy resin adhesive, if the primary agent and the curing agent are extremely poor in compatibility, although stirred, they do not mix well just as water and oil do not. For this reason, it is preferable to mix the primary agent and the curing agent which are compatible to each other. Furthermore, when the hydrodynamic bearing device of the present invention is applied in a hard disk driving motor, it is ideal to select the two-part liquid epoxy resin adhesive that does not generate out gas, which affects a magnetic head, etc.

In the embodiment illustrated in FIG. 1, the covering member 40 and the bearing sleeve 20 are fixed together by the two-part liquid epoxy resin adhesive as well as by a caulking means. In other words, a caulking is [additionally] applied to an entire or a part of the periphery of a caulking portion 24, which is formed in advance at the end portion of the bearing sleeve 20, to firmly fix both the members. This increases the joint strength between the covering member 40 and the bearing sleeve 20 and improves shock resistance of the hydrodynamic bearing device. Note that a joining means by screwing or welding may be used in place of the caulking means for joining the covering member 40 and the bearing sleeve 20 to improve shock resistance in the same manner.

Figure 2:
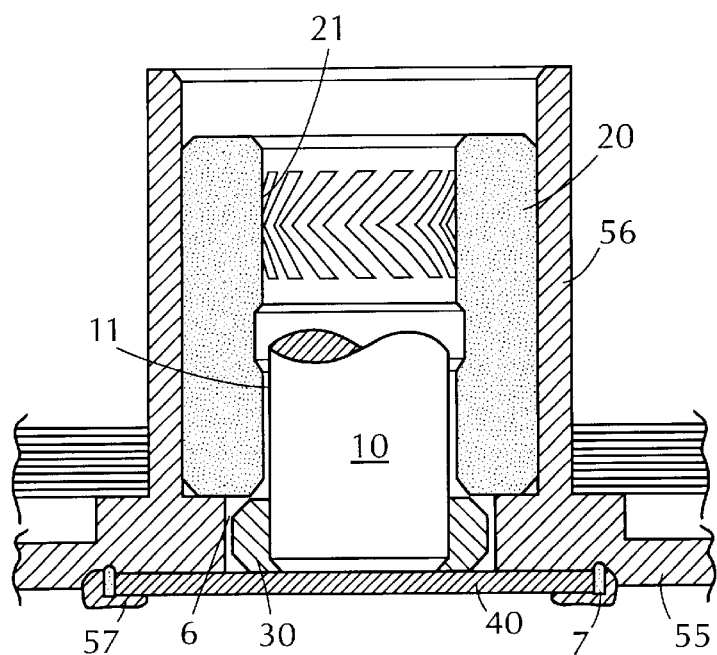
FIG. 2 is a cross-sectional view of another embodiment of the hydrodynamic bearing device of the present invention.

Next, another embodiment of the present invention is described referring to FIG. 2. FIG. 2 shows an enlarged major portion of a rotary-shaft-type hydrodynamic bearing device to which the invention of claim 2 is applied. In the rotary-shaft-type hydrodynamic bearing device of FIG. 1, the counter plate 40 is joined as the covering member with the opening portion of the bearing sleeve 20 and sealed with the two-part liquid epoxy resin. In the embodiment of FIG. 2, the covering member 40 is joined to the opening portion of the frame 55 with the above mentioned two-part liquid epoxy resin. Note that since other configurations of this embodiment remain the same as those of FIG. 1, the members having the same functions are given the same codes and the same descriptions are not repeated here. The hydrodynamic bearing device of FIG. 2 comprises a cylindrical bearing sleeve 20 which has a first dynamic pressure generating surface 21, a frame 55 which has a sleeve holding portion 56 for holding the bearing sleeve 20, a rotary shaft Chemical formula 1

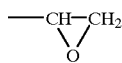

Chemical formula 2

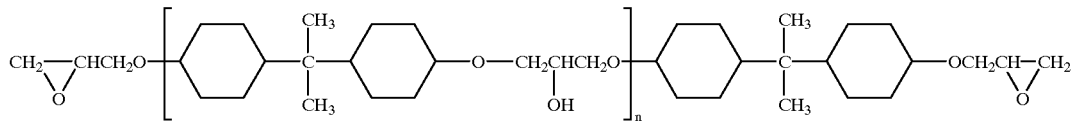

In Chemical formula 2, the value of n in the structural formula of the epoxy resin is between 0 and 30. When the structure of the epoxy resin becomes 3-dimensional as the resin is hardened, epoxy sidearms at both ends of a molecule play an important role; when n is 1 or larger, a hydroxyl group, —OH, existing in the molecule plays a secondary role. With the effect of the curing agent, the epoxy resin that has at least two or more epoxy sidearms in a molecule starts bridging, which makes the structure 3-dimensional. Used as

10 which has a second dynamic pressure generating surface 11 and is attached relatively rotatable to the bearing sleeve 20, a lubricant 6 filled in a gap between the first and second dynamic pressure generating surfaces 11 and 21, and a covering member 40 which is fixed by adhesive to one of the opening portions of the frame 55 to prevent the lubricant 6 from leaking. A ring-like thrust plate 30 that has dynamic pressure generating grooves on an end surface thereof in the thrust direction is fitted into one of the ends of the rotary shaft 10. The thrust plate 30 supports the thrust load on the rotor assembly that includes the rotary shaft 10. A hub fixed onto the other end of the rotary shaft 10 and a rotor magnet attached to the hub are not illustrated in the figure.

In FIG. 2, the two-part liquid epoxy resin adhesive 7 is filled in the joining portion between the frame 55 and the covering member 40 to join both members and seal the gap, the two-part liquid epoxy resin adhesive 7 satisfying the following condition, $$n/2 \leq m \leq 2n$$

where m is the molecular-weight of the primary agent and n is the molecular-weight of the curing agent. Also in this embodiment, the covering member 40 and the frame 55 are joined by the two-part liquid epoxy resin adhesive 7 in which the molecular-weight of the primary agent and that of the curing agent are relatively close. Therefore, the primary agent and the curing agent diffuse at the same speed in the gap in the thrust direction between the covering member 40 and the frame 55, causing a curing reaction in the gap for sure. This prevents the adhesive 7 from remaining uncured or permeating into the lubricant 6. Thus, the covering member 40 is fixed firmly by the adhesive 7, and the lubricant 6 is kept from leaking to the outside.

Also, a plastic deformation may be given to the caulking portion 57 of the frame 55 and a caulking is applied to the outer periphery of the covering member 40 to increase the joint strength between the frame 55 and the covering member 40, which in turn increases shock resistance of the hydrodynamic bearing device. Note that a joining means by screwing or welding may be used in place of the caulking means to improve shock resistance in the same manner.

Figure 3:
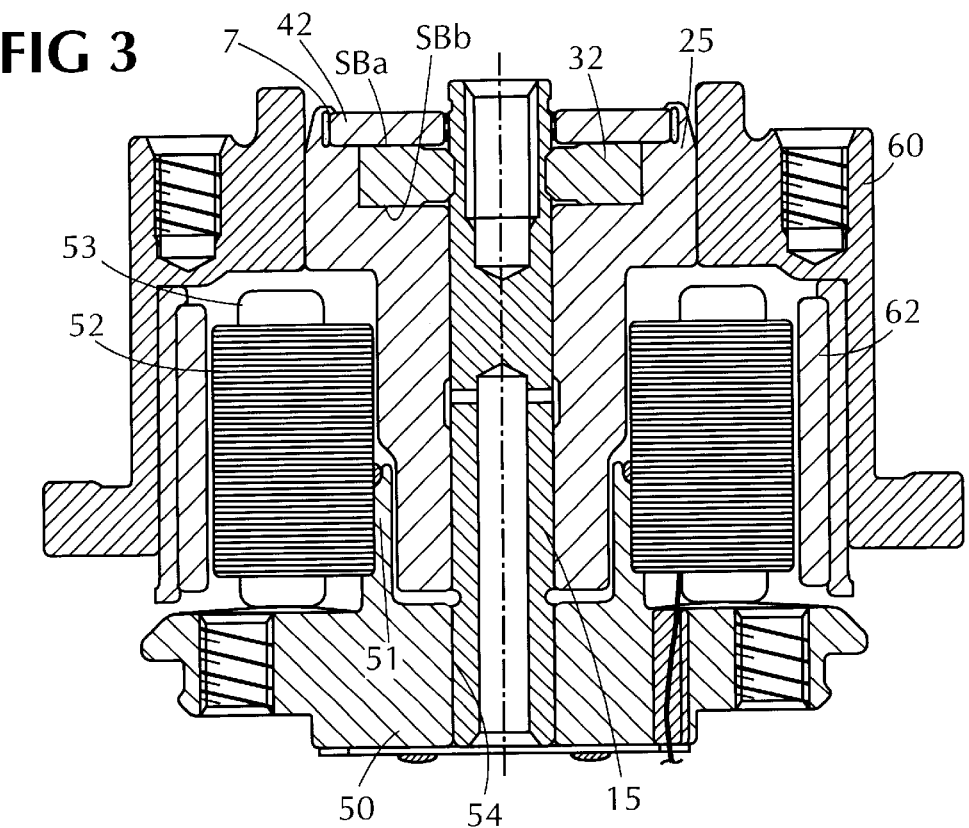
FIG. 3 is a cross-sectional view of further another embodiment of the hydrodynamic bearing device of the present invention.

Next, another embodiment of the hydrodynamic bearing device of the present invention is described referring to FIG. 3 that shows an example applied in a fixed-shaft-type spindle motor. Note that the same members as those in the rotary-shaft-type spindle motor of FIG. 1 are given the same codes, and the same descriptions are not repeated here. In FIG. 3, a frame 50 of the motor has a center hole 54 and a cylindrical core holding portion 51. A bottom portion of a fixed shaft 15 is fitted into the center hole 54. A stator core 52 is attached to the outer circumference of the core holding portion 51. A cylindrical bearing sleeve 25 is fitted onto the fixed shaft 15 which stands upright from the frame 50, and both the members are supported by a lubricant filled therebetween so that they are relatively rotatable. A hub 60 is fixed onto the upper outer circumference of the bearing sleeve 25 so that the bearing sleeve 25 and the hub 60 are united. A hard disk (not illustrated) is to be mounted on the hub 60 so that the hard disk rotates together with the hub 60.

A ring-like thrust plate 32 is fixed around the upper outer circumference of the fixed shaft 15. A counter plate 42 as a covering member is joined to the upper opening portion of the bearing sleeve 25 by the same two-part liquid epoxy resin adhesive 7 as the one described in the above embodiments.

Note that the surfaces of the counter plate 42 and of the thrust plate 32 which are axially opposed and the surfaces of the thrust plate 42 and of the bearing sleeve 25 which are axially opposed create a pair of thrust hydrodynamic bearing surfaces. Thus, the thrust hydrodynamic bearing portions SBa and SBb are created on the top and bottom surfaces of the thrust plate 32. Further, a lubricant is filled in the thrust hydrodynamic bearing portions SBa and SBb. As the rotary members rotate, each of the thrust hydrodynamic bearing portions SBa and SBb generates a dynamic pressure, with which the rotary members and the fixed members rotate in a relatively non-contact manner.

In FIG. 3, the two-part liquid epoxy resin adhesive is filled in the joining portion between the bearing sleeve 25 and the counter plate 42 to join them and seal the gap, the two-part resin adhesive satisfying the following condition, $$n/2 \leq m \leq 2n$$

where m is the molecular-weight of the primary agent and n is the molecular weight of the curing agent. The counter plate 42 and the bearing sleeve 25 are joined by the two-part liquid epoxy resin adhesive 7 in which the molecular-weight of the primary agent and that of the curing agent are relatively close. Therefore, the primary agent and the curing agent diffuse at the same speed in the gap in the thrust direction between the counter plate 42 and the bearing sleeve 25, causing a curing reaction in the gap for sure. This prevents the adhesive 7 from remaining uncured or diffusing into the lubricant 6. Thus, the counter plate 42 is fixed firmly by the adhesive 7, and the lubricant 6 is kept from leaking to the outside.

The embodiments of the invention devised by the present inventor have been described in detail. However, it is understood that the present invention is not limited to the above embodiments, but can be variously modified within the scope of the invention. Although Table 1 shows six examples (A through E) of the primary agent molecular-weight and the curing agent molecular-weight of the two-part liquid epoxy resin adhesive of the present invention, the molecular-weight ratio is not limited to these examples, but any molecular-weight ratio can provide the same effects as the above embodiments as long as the two-part liquid epoxy resin satisfies the condition $$n/2 \leq m \leq 2n$$

where m is the molecular-weight of the primary agent and n is the molecular-weight of the curing agent.

As described above, according to the present invention, the two-part liquid epoxy resin, in which the molecular-weight of the primary agent is relatively close to the molecular weight of the curing agent, is used to join the covering member and the counter member. Since the primary agent and the curing agent diffuse at the same speed in the gap between the covering member and the counter member, a curing reaction is caused in the gap for sure. This prevents the adhesive from remaining uncured or permeating into the lubricant. Consequently the covering member is firmly fixed by the adhesive, and the lubricant is kept from leaking to the outside.

The present invention is not to be considered limited in scope by the preferred embodiments described in the specification. Additional advantages and modifications, which readily occur to those skilled in the art from consideration of the specification and practice of the invention, are intended to be within the scope and spirit of the following claims.

I claim:

1. A hydrodynamic bearing device comprising:
   a cylindrical bearing sleeve which has a first dynamic pressure generating surface;
   a shaft member which has a second dynamic pressure generating surface and is rotably attached to said bearing sleeve;
   a lubricant filled in a gap between said first and second dynamic pressure generating surfaces;
   a covering member which is fixed by adhesive to one of the openings of said bearing sleeve to prevent said lubricant from leaking; and an adhesive which is applied in a joining portion between said bearing sleeve and said covering member to seal a gap therebetween;

wherein said adhesive is a two-part liquid epoxy resin adhesive that satisfies the condition, $$n/2 \leq m \leq 2n$$

where m is the molecular-weight of a primary agent and n is the molecular-weight of a curing agent.

2. The hydrodynamic bearing device as set forth in claim 1, wherein said molecular-weight, m, of said primary agent is substantially equivalent to said molecular-weight, n, of said curing agent.

3. The hydrodynamic bearing device as set forth in claim 1, wherein a joining means by caulking, screwing, or welding is further used to join said covering member and said bearing sleeve.

4. A hydrodynamic bearing device comprising:

a cylindrical bearing sleeve which has a first dynamic pressure generating surface;

a frame which has a sleeve holding portion for holding said bearing sleeve;

a shaft member which has a second dynamic pressure generating surface and is rotatably attached to said bearing sleeve;

a lubricant filled in a gap between said first and second dynamic pressure generating surfaces;

a covering member which is fixed by adhesive to one of the openings of said frame to prevent said lubricant from leaking; and an adhesive which is applied in a joining portion between said bearing sleeve and said covering member to seal a gap therebetween;

wherein said adhesive is a two-part liquid epoxy resin adhesive that satisfies the condition, $$n/2 \leq m \leq 2n$$

where m is the molecular-weight of a primary agent and n is the molecular-weight of a curing agent.

5. The hydrodynamic bearing device as set forth in claim 4, wherein a joining means by caulking, screwing, or welding is further used to join said covering member and said bearing sleeve.

6. The hydrodynamic bearing device as set forth in claim 4, wherein said molecular-weight, m, of said primary agent is substantially equivalent to said molecular-weight, n, of said curing agent.

* * * * *